US012750164B2

(12) United States Patent
Wang et al.

(10) Patent No.: US 12,750,164 B2
(45) Date of Patent: Sep. 29, 2026

(54) TWO STAGE HYBRID AUTOMATIC REPEAT REQUEST ACKNOWLEDGEMENT (HARQ-ACK) USING MIXED ORTHOGONAL MULTIPLE ACCESS (OMA) AND NON-ORTHOGONAL MULTIPLE ACCESS (NOMA)

(71) Applicant: QUALCOMM Incorporated, San Diego, CA (US)

(72) Inventors: Hua Wang, Basking Ridge, NJ (US); Junyi Li, Fairless Hills, PA (US); Tianyang Bai, Mountain View, CA (US)

(73) Assignee: QUALCOMM Incorporated, San Diego, CA (US)

( * ) Notice: Subject to any disclaimer, the term of this patent is extended or adjusted under 35 U.S.C. 154(b) by 371 days.

(21) Appl. No.: 18/467,623

(22) Filed: Sep. 14, 2023

(65) Prior Publication Data

US 2025/0096947 A1 Mar. 20, 2025

(51) Int. Cl.
*H04L 1/1812* (2023.01)
*H04L 5/00* (2006.01)
(Continued)

(52) U.S. Cl.
CPC .......... *H04L 1/1812* (2013.01); *H04L 5/0005* (2013.01); *H04W 72/232* (2023.01); *H04W 76/20* (2018.02)

(58) Field of Classification Search
CPC ....... H04L 1/08; H04L 1/1812; H04L 1/1854; H04L 1/1858; H04L 1/1896; H04L 5/0005; H04W 72/232; H04W 76/20
See application file for complete search history.

(56) References Cited

U.S. PATENT DOCUMENTS 8,830,883 B2 * 9/2014 Chen ..................... H04L 5/0053 370/280
10,103,831 B2 * 10/2018 Seo ....................... H04L 5/0037
(Continued)

FOREIGN PATENT DOCUMENTS

CN 107154839 A * 9/2017 ........... H04L 1/0061
CN 107154839 B * 11/2019 ........... H04L 1/1812
(Continued)

OTHER PUBLICATIONS

CAICT: "Considerations on Procedures of NOMA Schemes", R1-1813500, 3GPP TSG RAN WG1 Meeting #95, 3rd Generation Partnership Project, Spokane, US, Nov. 12, 2018-Nov. 16, 2018, 4 Pages.

(Continued)

*Primary Examiner* — Eric Nowlin
(74) *Attorney, Agent, or Firm* — Seyfarth Shaw LLP

(57) ABSTRACT

A method of wireless communication by a user equipment (UE) includes transmitting, to a network node, a first stage hybrid automatic repeat request acknowledgement (HARQ-ACK) codebook on an orthogonal multiple access (OMA) resource. The method also includes transmitting, to the network node, a second stage HARQ-ACK codebook on a non-orthogonal multiple access (NOMA) resource in response to the first stage HARQ-ACK codebook indicating at least one negative acknowledgement (NACK).

12 Claims, 6 Drawing Sheets

(51) Int. Cl.
*H04W 72/232* (2023.01)
*H04W 76/20* (2018.01)

(56) References Cited

U.S. PATENT DOCUMENTS

| | | | | | |
|---|---|---|---|---|---|
| 10,326,560 | B2 * | 6/2019 | Kim | H04J 11/004 | |
| 10,892,859 | B2 * | 1/2021 | Lee | H04L 5/0023 | |
| 11,696,285 | B2 * | 7/2023 | Suh | H04W 72/23 | 370/329 |
| 12,225,534 | B2 * | 2/2025 | Kang | H04L 5/0055 | |
| 2016/0337087 | A1 * | 11/2016 | Chen | H04L 1/1861 | |
| 2017/0338915 | A1 * | 11/2017 | Kim | H04L 1/1812 | |
| 2018/0152257 | A1 * | 5/2018 | Seo | H04L 1/1812 | |
| 2019/0327061 | A1 * | 10/2019 | Li | H04W 72/0466 | |
| 2019/0356423 | A1 * | 11/2019 | Lee | H04L 5/0082 | |
| 2020/0244407 | A1 * | 7/2020 | Makki | H04L 1/1887 | |
| 2021/0385809 | A1 * | 12/2021 | Kang | H04W 72/0453 | |
| 2022/0124775 | A1 * | 4/2022 | Zhang | H04L 1/1854 | |
| 2022/0400475 | A1 * | 12/2022 | Suh | H04W 72/23 | |
| 2023/0155720 | A1 * | 5/2023 | Yin | H04L 1/0013 | 370/329 |
| 2023/0396391 | A1 * | 12/2023 | Zhang | H04L 1/1854 | |
| 2025/0096952 | A1 * | 3/2025 | Khoshnevisan | H04W 72/21 | |

FOREIGN PATENT DOCUMENTS

| | | | | | |
|---|---|---|---|---|---|
| EP | 3855663 | A1 | | 7/2021 | |
| WO | WO-2016072696 | A2 | * | 5/2016 | H04L 1/1819 |
| WO | WO-2016175535 | A1 | * | 11/2016 | H04W 52/346 |
| WO | WO-2018064582 | A1 | * | 4/2018 | H04L 1/1861 |
| WO | WO-2018128200 | A1 | * | 7/2018 | H04L 1/1861 |
| WO | WO-2022086189 | A1 | * | 4/2022 | H04L 5/0094 |
| WO | WO-2022086191 | A1 | * | 4/2022 | H04W 72/21 |

OTHER PUBLICATIONS

International Search Report and Written Opinion—PCT/US2024/041831—ISA/EPO—Oct. 25, 2024.

* cited by examiner

TWO STAGE HYBRID AUTOMATIC REPEAT REQUEST ACKNOWLEDGEMENT (HARQ-ACK) USING MIXED ORTHOGONAL MULTIPLE ACCESS (OMA) AND NON-ORTHOGONAL MULTIPLE ACCESS (NOMA)

FIELD OF THE DISCLOSURE

The present disclosure relates generally to hybrid automatic repeat request acknowledgement (HARQ-ACK) during wireless communications, and more specifically to two stage HARQ-ACK using mixed orthogonal multiple access (OMA) and non-orthogonal multiple access (NOMA).

BACKGROUND

Wireless communications systems are widely deployed to provide various telecommunications services such as telephony, video, data, messaging, and broadcasts. Typical wireless communications systems may employ multiple-access technologies capable of supporting communications with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and long term evolution (LTE). LTE/LTE-Advanced is a set of enhancements to the universal mobile telecommunications system (UMTS) mobile standard promulgated by the Third Generation Partnership Project (3GPP). Narrowband (NB)-Internet of things (IoT) and enhanced machine-type communications (eMTC) are a set of enhancements to LTE for machine type communications.

A wireless communications network may include a number of base stations (BSs) that can support communications for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail, a BS may be referred to as a Node B, an evolved Node B (eNB), a gNB, an access point (AP), a radio head, a transmit and receive point (TRP), a new radio (NR) BS, a 5G Node B, and/or the like.

The above multiple access technologies have been adopted in various telecommunications standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation.

SUMMARY

In aspects of the present disclosure, a method of wireless communication by a user equipment (UE) includes transmitting, to a network node, a first stage hybrid automatic repeat request acknowledgement (HARQ-ACK) codebook on an orthogonal multiple access (OMA) resource. The method also includes transmitting, to the network node, a second stage HARQ-ACK codebook on a non-orthogonal multiple access (NOMA) resource in response to the first stage HARQ-ACK codebook indicating at least one negative acknowledgement (NACK).

Other aspects of the present disclosure are directed to an apparatus. The apparatus has one or more memories and one or more processors coupled to the one or more memories. The processor(s) is configured to transmit, to a network node, a first stage hybrid automatic repeat request acknowledgement (HARQ-ACK) codebook on an orthogonal multiple access (OMA) resource. The processor(s) is also configured to transmit, to the network node, a second stage HARQ-ACK codebook on a non-orthogonal multiple access (NOMA) resource in response to the first stage HARQ-ACK codebook indicating at least one negative acknowledgement (NACK).

In other aspects of the present disclosure, a method of wireless communication by a network device includes receiving, from a user equipment (UE), a first stage hybrid automatic repeat request acknowledgement (HARQ-ACK) codebook on an orthogonal multiple access (OMA) resource. The method also includes receiving, from the UE, a second stage HARQ-ACK codebook on a non-orthogonal multiple access (NOMA) resource in response to the first stage HARQ-ACK codebook indicating at least one negative acknowledgment (NACK).

Other aspects of the present disclosure are directed to an apparatus. The apparatus has one or more memories and one or more processors coupled to the one or more memories. The processor(s) is configured to receive, from a user equipment (UE), a first stage hybrid automatic repeat request acknowledgement (HARQ-ACK) codebook on an orthogonal multiple access (OMA) resource. The processor(s) is also configured to receive, from the UE, a second stage HARQ-ACK codebook on a non-orthogonal multiple access (NOMA) resource in response to the first stage HARQ-ACK codebook indicating at least one negative acknowledgment (NACK).

Aspects generally include a method, apparatus, system, computer program product, non-transitory computer-readable medium, user equipment, base station, wireless communication device, and processing system as substantially described with reference to and as illustrated by the accompanying drawings and specification.

The foregoing has outlined rather broadly the features and technical advantages of examples according to the disclosure in order that the detailed description that follows may be better understood. Additional features and advantages will be described. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that features of the present disclosure can be understood in detail, a particular description may be had by reference to aspects, some of which are illustrated in the appended drawings. It is to be noted, however, that the appended drawings illustrate only certain aspects of this disclosure and are therefore not to be considered limiting of its scope, for the description may admit to other equally effective aspects. The same reference numbers in different drawings may identify the same or similar elements.

DETAILED DESCRIPTION

Figure 1:
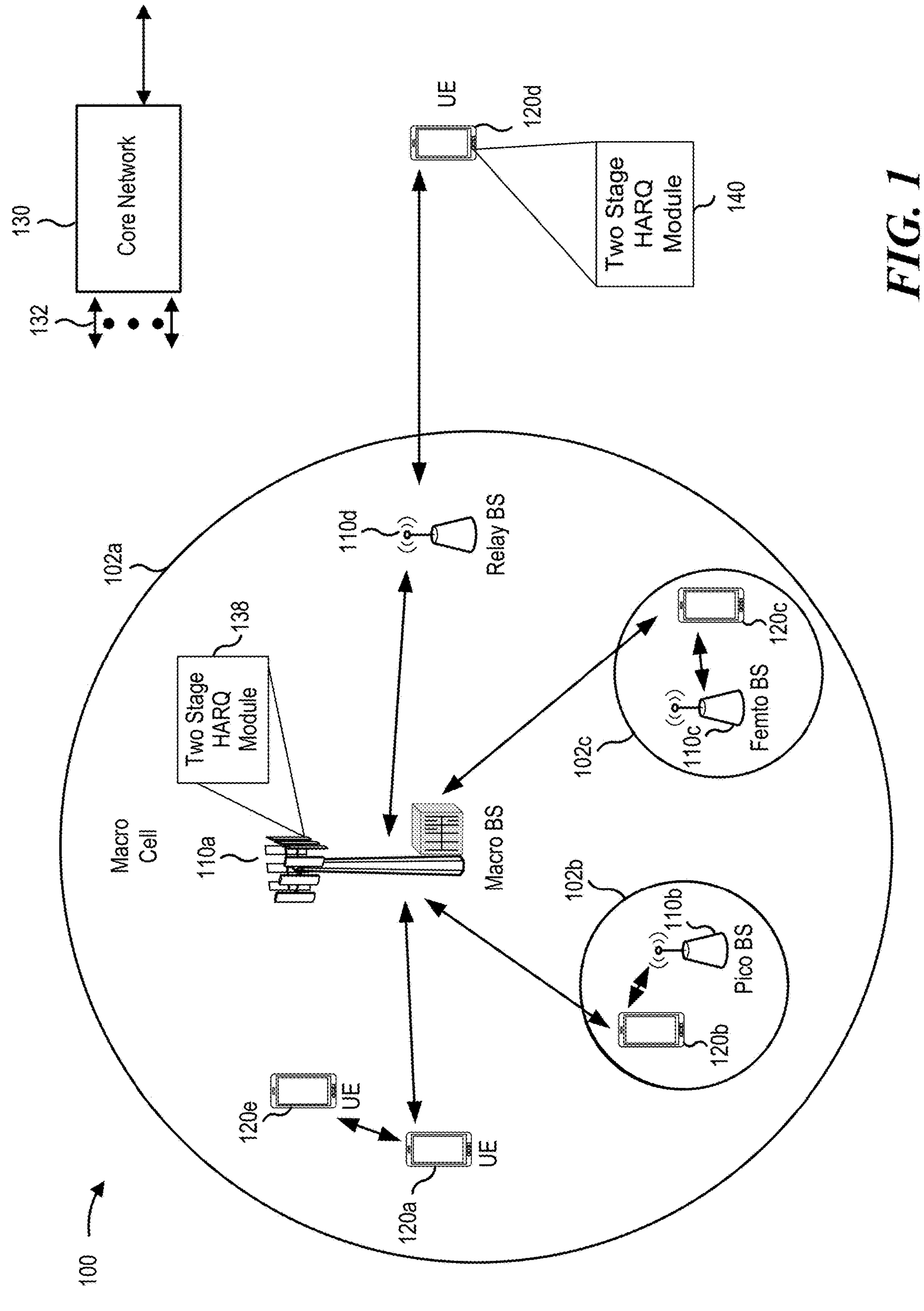
FIG. 1 is a block diagram conceptually illustrating an example of a wireless communications network, in accordance with various aspects of the present disclosure.

Various aspects of the disclosure are described more fully below with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method, which is practiced using other structure, functionality, or structure and functionality in addition to or other than the various aspects of the disclosure set forth. It should be understood that any aspect of the disclosure disclosed may be embodied by one or more elements of a claim.

Several aspects of telecommunications systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described using terminology commonly associated with 5G and later wireless technologies, aspects of the present disclosure can be applied in other generation-based communications systems, such as and including 3G and/or 4G technologies.

Wireless communications may be unreliable at times. Techniques, such as hybrid automatic repeat request (HARQ) may help recover transmission errors by allowing a receiver to indicate to a transmitter whether a code block has been correctly decoded. The receiver may send an acknowledgement (ACK) in response to correctly decoding the code block and may send a negative acknowledgement (NACK) in response to failing to decode the code block. The transmitter may retransmit the code block in response to receiving a NACK, such that the receiver may correctly decode the retransmission. In some cases, multiple retransmissions may occur. The resources for hybrid automatic repeat request acknowledgment (HARQ-ACK) feedback, which may be carried in a physical uplink control channel (PUCCH), are significant. It would be desirable to reduce the number of bits allocated for HARQ-ACK feedback in the PUCCH.

According to aspects of the present disclosure, a two stage HARQ-ACK codebook is used for multi-bit HARQ-ACK feedback. The first stage codebook is a single bit. This bit indicates whether all of the multi-bit HARQ-ACK feedback is ACK. The first stage uses orthogonal multiple access (OMA) PUCCH resources for high reliability. Each user equipment (UE) is allocated a different resource, such as time division multiplexed (TDM), frequency division multiplexed (FDM), or code division multiplexed (CDM) resources.

If the first stage HARQ-ACK codebook indicates that at least one bit of the multi-bit HARQ-ACK feedback is a NACK, then the UE transmits a second stage HARQ-ACK codebook. The UE may generate the second stage HARQ-ACK codebook in accordance with current standards defining multi-bit HARQ-ACK. The UE transmits the second stage HARQ-ACK codebook with non-orthogonal multiple access (NOMA) PUCCH resources shared among several UEs. The use of NOMA resources increases network capacity.

Particular aspects of the subject matter described in this disclosure can be implemented to realize one or more of the following potential advantages. In some examples, the described techniques, such as two stage mixed OMA/NOMA HARQ-ACK feedback, may increase network capacity by using fewer resources.

FIG. 1 is a diagram illustrating a wireless network 100 in which aspects of the present disclosure may be practiced. The wireless network 100 may be a 5G or NR network or some other wireless network, such as an LTE network. The wireless network 100 may include a number of BSs 110 (shown as BS 110*a*, BS 110*b*, BS 110*c*, and BS 110*d*) and other network entities. A BS is an entity that communicates with user equipment (UEs) and may also be referred to as a base station, an NR BS, a Node B, a gNB, a 5G Node B, an access point, a transmit and receive point (TRP), a network node, a network entity, and/or the like. A base station can be implemented as an aggregated base station, as a disaggregated base station, an integrated access and backhaul (IAB) node, a relay node, a sidelink node, etc. The base station can be implemented in an aggregated or monolithic base station architecture, or alternatively, in a disaggregated base station architecture, and may include one or more of a central unit (CU), a distributed unit (DU), a radio unit (RU), a near-real time (near-RT) RAN intelligent controller (RIC), or a non-real time (non-RT) RIC.

Each BS may provide communications coverage for a particular geographic area. In 3GPP, the term "cell" can refer to a coverage area of a BS and/or a BS subsystem serving this coverage area, depending on the context in which the term is used.

A BS may provide communications coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110*a* may be a macro BS for a macro cell 102*a*, a BS 110*b* may be a pico BS for a pico cell 102*b*, and a BS 110*c* may be a femto BS for a femto cell 102*c*. A BS may support one or multiple (e.g., three) cells. The terms "eNB," "base station," "NR BS," "gNB," "AP," "Node B," "5G NB," "TRP," and "cell" may be used interchangeably.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

The wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110*d* may communicate with macro BS 110*a* and a UE 120*d* in order to facilitate communications between the BS 110*a* and UE 120*d*. A relay station may also be referred to as a relay BS, a relay base station, a relay, and/or the like.

The wireless network 100 may be a heterogeneous network that includes BSs of different types (e.g., macro BSs, pico BSs, femto BSs, relay BSs, and/or the like). These different types of BSs may have different transmit power levels, different coverage areas, and different impact on interference in the wireless network 100. For example, macro BSs may have a high transmit power level (e.g., 5 to 40 watts) whereas pico BSs, femto BSs, and relay BSs may have lower transmit power levels (e.g., 0.1 to 2 watts).

As an example, the BSs 110 (shown as BS 110*a*, BS 110*b*, BS 110*c*, and BS 110*d*) and the core network 130 may exchange communications via backhaul links 132 (e.g., S1, etc.). Base stations 110 may communicate with one another over other backhaul links (e.g., X2, etc.) either directly or indirectly (e.g., through core network 130).

The core network 130 may be an evolved packet core (EPC), which may include at least one mobility management entity (MME), at least one serving gateway (S-GW), and at least one packet data network (PDN) gateway (P-GW). The MME may be the control node that processes the signaling between the UEs 120 and the EPC. All user IP packets may be transferred through the S-GW, which itself may be connected to the P-GW. The P-GW may provide IP address allocation as well as other functions. The P-GW may be connected to the network operator's IP services. The operator's IP services may include the Internet, the Intranet, an IP multimedia subsystem (IMS), and a packet-switched (PS) streaming service.

The core network 130 may provide user authentication, access authorization, tracking, IP connectivity, and other access, routing, or mobility functions. One or more of the base stations 110 or access node controllers (ANCs) may interface with the core network 130 through backhaul links 132 (e.g., S1, S2, etc.) and may perform radio configuration and scheduling for communications with the UEs 120. In some configurations, various functions of each access network entity or base station 110 may be distributed across various network devices (e.g., radio heads and access network controllers) or consolidated into a single network device (e.g., a base station 110).

UEs 120 (e.g., 120*a*, 120*b*, 120*c*) may be dispersed throughout the wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

One or more UEs 120 may establish a protocol data unit (PDU) session for a network slice. In some cases, the UE 120 may select a network slice based on an application or subscription service. By having different network slices serving different applications or subscriptions, the UE 120 may improve its resource utilization in the wireless network 100, while also satisfying performance specifications of individual applications of the UE 120. In some cases, the network slices used by UE 120 may be served by an AMF (not shown in FIG. 1) associated with one or both of the base station 110 or core network 130. In addition, session management of the network slices may be performed by an access and mobility management function (AMF).

The UEs 120 may include a two stage hybrid automatic repeat request (HARQ) module 140. For brevity, only one UE 120*d* is shown as including the two stage HARQ module 140. The two stage HARQ module 140 may transmit, to a network node, a first stage hybrid automatic repeat request acknowledgement (HARQ-ACK) codebook on an orthogonal multiple access (OMA) resource. The two stage HARQ module 140 may also transmit, to the network node, a second stage HARQ-ACK codebook on a non-orthogonal multiple access (NOMA) resource in response to the first stage HARQ-ACK codebook indicating at least one negative acknowledgement (NACK).

Figure 3:
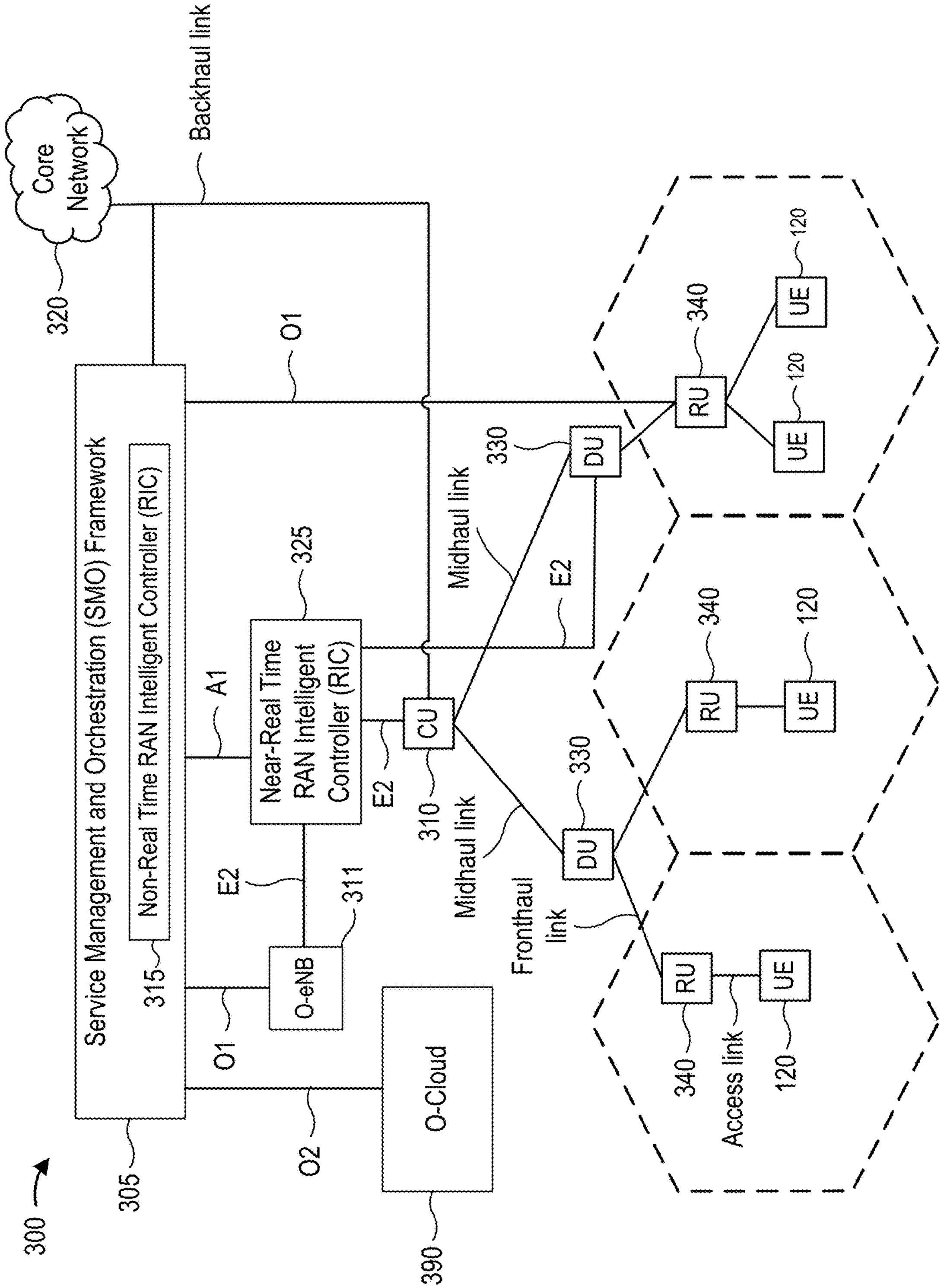
FIG. 3 is a block diagram illustrating an example disaggregated base station architecture, in accordance with various aspects of the present disclosure.

The core network 130 or the base stations 110 or any other network device (e.g., as seen in FIG. 3) may include a two stage HARQ module 138. For brevity, only one base station 110*a* is shown as including the two stage HARQ module 138. The two stage HARQ module 138 may receive, from a user equipment (UE), a first stage hybrid automatic repeat request acknowledgement (HARQ-ACK) codebook on an orthogonal multiple access (OMA) resource. The two stage HARQ module 138 may also receive, from the UE, a second stage HARQ-ACK codebook on a non-orthogonal multiple access (NOMA) resource in response to the first stage HARQ-ACK codebook indicating at least one negative acknowledgment (NACK).

Some UEs may be considered machine-type communications (MTC) or evolved or enhanced machine-type communications (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a customer premises equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere as being performed by the base station 110. For example, the base station 110 may configure a UE 120 via downlink control information (DCI), radio resource control (RRC) signaling, a media access control-control element (MAC-CE) or via system information (e.g., a system information block (SIB).

As indicated above, FIG. 1 is provided merely as an example. Other examples may differ from what is described with regard to FIG. 1.

Figure 2:
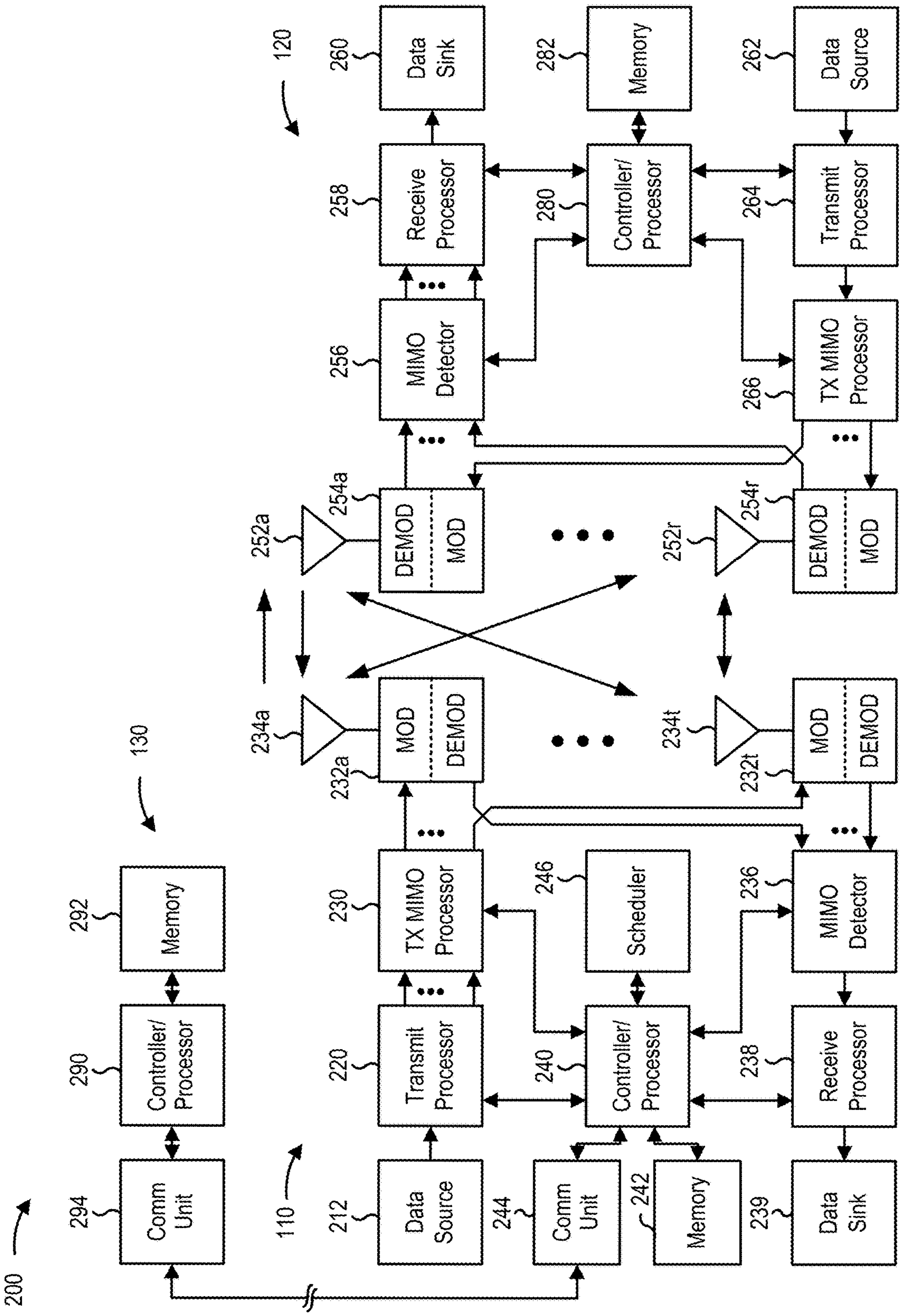
FIG. 2 is a block diagram conceptually illustrating an example of a base station in communication with a user equipment (UE) in a wireless communications network, in accordance with various aspects of the present disclosure.

FIG. 2 shows a block diagram of a design 200 of the base station 110 and UE 120, which may be one of the base stations and one of the UEs in FIG. 1. The base station 110 may be equipped with T antennas 234*a* through 234*t*, and UE 120 may be equipped with R antennas 252*a* through 252*r*, where in general T≥1 and R≥1.

At the base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Decreasing the MCS lowers throughput but increases reliability of the transmission. The transmit processor 220 may also process system information (e.g., for semi-static resource partitioning information (SRPI) and/or the like) and control information (e.g., CQI requests, grants, upper layer signaling, and/or the like) and provide overhead symbols and control symbols. The transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for orthogonal frequency division multiplexing (OFDM) and/or the like) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively. According to various aspects described in more detail below, the synchronization signals can be generated with location encoding to convey additional information.

At the UE 120, antennas 252*a* through 252*r* may receive the downlink signals from the base station 110 and/or other base stations and may provide received signals to demodulators (DEMODs) 254*a* through 254*r*, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for the UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of the UE 120 may be included in a housing.

On the uplink, at the UE 120, a transmit processor 264 may receive and process data from a data source 262 and control information (e.g., for reports comprising RSRP, RSSI, RSRQ, CQI, and/or the like) from the controller/processor 280. Transmit processor 264 may also generate reference symbols for one or more reference signals. The symbols from the transmit processor 264 may be precoded by a TX MIMO processor 266 if applicable, further processed by modulators 254*a* through 254*r* (e.g., for discrete Fourier transform spread OFDM (DFT-s-OFDM), CP-OFDM, and/or the like), and transmitted to the base station 110. At the base station 110, the uplink signals from the UE 120 and other UEs may be received by the antennas 234, processed by the demodulators 254, detected by a MIMO detector 236 if applicable, and further processed by a receive processor 238 to obtain decoded data and control information sent by the UE 120. The receive processor 238 may provide the decoded data to a data sink 239 and the decoded control information to a controller/processor 240. The base station 110 may include communications unit 244 and communicate to the core network 130 via the communications unit 244. The core network 130 may include a communications unit 294, a controller/processor 290, and a memory 292.

The controller/processor 240 of the base station 110, the controller/processor 280 of the UE 120, and/or any other component(s) of FIG. 2 may perform one or more techniques associated with two stage mixed orthogonal/non-orthogonal multiple access HARQ-ACK transmission, as described in more detail elsewhere. For example, the controller/processor 240 of the base station 110, the controller/processor 280 of the UE 120, and/or any other component(s) of FIG. 2 may perform or direct operations of, for example, the processes of FIGS. 4-6 and/or other processes as described. Memories 242 and 282 may store data and program codes for the base station 110 and UE 120, respectively. A scheduler 246 may schedule UEs for data transmission on the downlink and/or uplink.

In some aspects, the UE 120 and/or base station 110 may include means for transmitting, and means for receiving. Such means may include one or more components of the UE 120 or base station 110 described in connection with FIG. 2.

As indicated above, FIG. 2 is provided merely as an example. Other examples may differ from what is described with regard to FIG. 2.

Deployment of communication systems, such as 5G new radio (NR) systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), an evolved NB (eNB), an NR BS, 5G NB, an access point (AP), a transmit and receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU, and RU also can be implemented as virtual units (e.g., a virtual central unit (VCU), a virtual distributed unit (VDU), or a virtual radio unit (VRU)).

Base station-type operations or network designs may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

In some cases, different types of devices supporting different types of applications and/or services may coexist in a cell. Examples of different types of devices include UE handsets, customer premises equipment (CPEs), vehicles, Internet of Things (IoT) devices, and/or the like. Examples of different types of applications include ultra-reliable low-latency communications (URLLC) applications, massive machine-type communications (mMTC) applications, enhanced mobile broadband (eMBB) applications, vehicle-to-anything (V2X) applications, and/or the like. Furthermore, in some cases, a single device may support different applications or services simultaneously.

FIG. 3 shows a diagram illustrating an example disaggregated base station 300 architecture. The disaggregated base station 300 architecture may include one or more central units (CUs) 310 that can communicate directly with a core network 320 via a backhaul link, or indirectly with the core network 320 through one or more disaggregated base station units (such as a near-real time (near-RT) RAN intelligent controller (RIC) 325 via an E2 link, or a non-real time (non-RT) RIC 315 associated with a service management and orchestration (SMO) framework 305, or both). A CU 310 may communicate with one or more distributed units (DUs) 330 via respective midhaul links, such as an F1 interface. The DUs 330 may communicate with one or more radio units (RUs) 340 via respective fronthaul links. The RUs 340 may communicate with respective UEs 120 via one or more radio frequency (RF) access links. In some implementations, the UE 120 may be simultaneously served by multiple RUs 340.

Each of the units (e.g., the CUS 310, the DUs 330, the RUs 340, as well as the near-RT RICs 325, the non-RT RICs 315, and the SMO framework 305) may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 310 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 310. The CU 310 may be configured to handle user plane functionality (e.g., central unit-user plane (CU-UP)), control plane functionality (e.g., central unit-control Plane (CU-CP)), or a combination thereof. In some implementations, the CU 310 can be logically split into one or more CU-UP units and one or more CU-CP units. The CU-UP unit can communicate bi-directionally with the CU-CP unit via an interface, such as the E1 interface when implemented in an O-RAN configuration. The CU 310 can be implemented to communicate with the DU 330, as necessary, for network control and signaling.

The DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the Third Generation Partnership Project (3GPP). In some aspects, the DU 330 may further host one or more low PHY layers. Each layer (or module) can be implemented with an interface configured to communicate signals with other layers (and modules) hosted by the DU 330, or with the control functions hosted by the CU 310.

Lower-layer functionality can be implemented by one or more RUs 340. In some deployments, an RU 340, controlled by a DU 330, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 340 can be implemented to handle over the air (OTA) communication with one or more UEs 120. In some implementations, real-time and non-real-time aspects of control and user plane communication with the RU(s) 340 can be controlled by the corresponding DU 330. In some scenarios, this configuration can enable the DU(s) 330 and the CU 310 to be implemented in a cloud-based RAN architecture, such as a vRAN architecture.

The SMO framework 305 may be configured to support RAN deployment and provisioning of non-virtualized and virtualized network elements. For non-virtualized network elements, the SMO framework 305 may be configured to support the deployment of dedicated physical resources for RAN coverage requirements, which may be managed via an operations and maintenance interface (such as an O1 interface). For virtualized network elements, the SMO framework 305 may be configured to interact with a cloud computing platform (such as an open cloud (O-cloud) 390) to perform network element life cycle management (such as to instantiate virtualized network elements) via a cloud computing platform interface (such as an O2 interface). Such virtualized network elements can include, but are not limited to, CUs 310, DUs 330, RUs 340, and near-RT RICs 325. In some implementations, the SMO framework 305 can communicate with a hardware aspect of a 4G RAN, such as an open eNB (O-eNB) 311, via an O1 interface. Additionally, in some implementations, the SMO framework 305 can communicate directly with one or more RUs 340 via an O1 interface. The SMO framework 305 also may include a non-RT RIC 315 configured to support functionality of the SMO framework 305.

The non-RT RIC 315 may be configured to include a logical function that enables non-real-time control and optimization of RAN elements and resources, artificial intelligence/machine learning (AI/ML) workflows including model training and updates, or policy-based guidance of applications/features in the near-RT RIC 325. The non-RT RIC 315 may be coupled to or communicate with (such as via an A1 interface) the near-RT RIC 325. The near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as the O-eNB 311, with the near-RT RIC 325.

In some implementations, to generate AI/ML models to be deployed in the near-RT RIC 325, the non-RT RIC 315 may receive parameters or external enrichment information from external servers. Such information may be utilized by the near-RT RIC 325 and may be received at the SMO framework 305 or the non-RT RIC 315 from non-network data sources or from network functions. In some examples, the non-RT RIC 315 or the near-RT RIC 325 may be configured to tune RAN behavior or performance. For example, the non-RT RIC 315 may monitor long-term trends and patterns for performance and employ AI/ML models to perform corrective actions through the SMO framework 305 (such as reconfiguration via 01) or via creation of RAN management policies (such as A1 policies).

Wireless communications may be unreliable at times. Techniques, such as hybrid automatic repeat request (HARQ) may help recover transmission errors by allowing a receiver to indicate to a transmitter whether a code block has been correctly decoded. The receiver may send an acknowledgement (ACK) in response to correctly decoding the code block and may send a negative acknowledgement (NACK) in response to not being able to decode the code block. The transmitter may retransmit the code block in response to receiving a NACK, with the hope that the code block may be correctly decoded during the retransmission. In some cases, multiple retransmissions may occur. The resources for hybrid automatic repeat request acknowledgment (HARQ-ACK) feedback, which may be carried in a physical uplink control channel (PUCCH), are significant. It would be desirable to reduce the number of bits in the PUCCH for carrying HARQ-ACK feedback.

The physical uplink control channel (PUCCH) has a variety of different formats in the fifth generation (5G) Third Generation Partnership Project (3GPP) specifications. Some PUCCH formats carry more than two bits, and some formats allow multiplexing. Format 0 defines a one or two symbol short PUCCH for up to two bits, with UE multiplexing in the same physical resource block (PRB). Format 1 defines a four to fourteen symbol long PUCCH for up to two bits, with UE multiplexing in the same PRB. Format 2 defines a one or two symbol short PUCCH for more than two bits, with no UE multiplexing in the same PRB. Format 3 defines a four to fourteen symbol long PUCCH for more than two bits, with no UE multiplexing in the same PRB. Format 4 defines a four to fourteen symbol long PUCCH for more than two bits, with UE multiplexing in the same PRB.

Three types of HARQ-ACK codebooks are defined in 5G 3GPP specifications, where a codebook is represented as a sequence of bits. The type-1 HARQ-ACK codebook is a semi-static codebook. The type-2 HARQ-ACK codebook is a dynamic codebook. The type-3 HARQ-ACK codebook is for one shot feedback.

For downlink (DL) transmission, a target block error rate (BLER) may be set at around ten percent. Thus, a large portion of the HARQ feedback will be positive acknowledgement (e.g., ACK), as opposed to negative acknowledgment (NACK). Based on this assumption, the number of HARQ-ACK bits in the feedback can be reduced.

According to aspects of the present disclosure, a two stage HARQ-ACK codebook is used for multi-bit HARQ-ACK feedback. The first stage codebook is a single bit. This bit indicates whether all of the multi-bit HARQ-ACK feedback is ACK. In some implementations, the bit is set to one in case all HARQ-ACK feedback is ACK. If any of the multi-bit HARQ-ACK is NACK, the bit may be set to zero.

According to aspects of the present disclosure, the first stage uses orthogonal multiple access (OMA) PUCCH resources for high reliability. Each UE is allocated a different resource, such as time division multiplexed (TDM), frequency division multiplexed (FDM), or code division multiplexed (CDM) resources.

If the first stage codebook indicates that at least one bit of the multi-bit HARQ-ACK feedback is a NACK (e.g., first stage bit=0), then the UE transmits a second stage codebook. The UE may generate the second stage codebook in accordance with current standards defining multi-bit HARQ-ACK. The UE transmits the second stage codebook with non-orthogonal multiple access (NOMA) PUCCH resources shared among several UEs. The use of NOMA resources increases network capacity.

Figure 4:
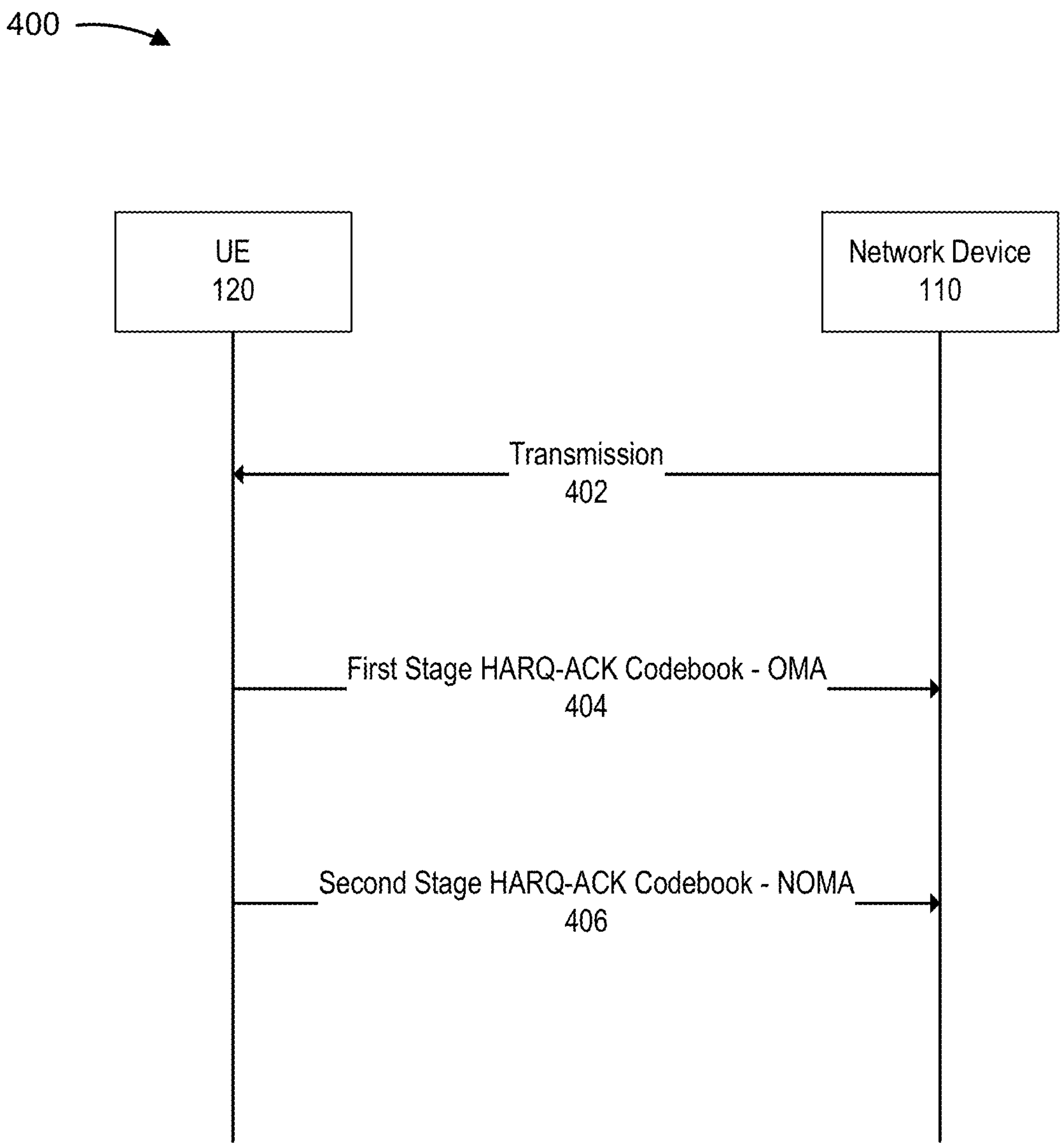
FIG. 4 is a call flow diagram illustrating mixed orthogonal multiple access (OMA) and non-orthogonal multiple access (NOMA) resources for two stage hybrid automatic repeat request acknowledgement (HARQ-ACK) transmission, in accordance with various aspects of the present disclosure.

FIG. 4 is a call flow diagram illustrating mixed orthogonal multiple access (OMA) and non-orthogonal multiple access (NOMA) resources for two stage hybrid automatic repeat request acknowledgement (HARQ-ACK) transmission, in accordance with various aspects of the present disclosure. In the example of FIG. 4, a UE 120 receives a transmission from a network device 110, such as a base station, at time 402. The transmission may include multiple code blocks. The UE sends ACK NACK feedback, depending on whether the UE 120 successfully decodes the code blocks in the transmission. The UE 120 communicates a first stage of a HARQ-ACK codebook to a network device 110, at time 404. The first stage may include a single bit indicating whether all HARQ feedback is ACK. The UE 120 transmits the first stage HARQ-ACK codebook on an orthogonal multiple access (OMA) resource. If the first stage codebook indicates that at least one bit of the multi-bit HARQ-ACK feedback is a NACK (e.g., first stage bit=0), then the UE 120 transmits a second stage HARQ-ACK codebook to the network device 110, at time 406. The UE 120 transmits the second stage HARQ-ACK codebook with non-orthogonal multiple access (NOMA) PUCCH resources shared among several UEs.

The probability of collision on the NOMA resources is small. Moreover, NOMA resources improve the reliability of the second stage HARQ-ACK feedback when there is a collision, for example, by employing a successive decoding scheme. With a successive decoding scheme, a high power message may be decoded first, and then a low power second message is decoded by subtracting the high power message from the received signal.

To understand the low probability of collision, assume two user equipment (UEs) both send four bit HARQ-ACK feedback to a base station (e.g., gNB). With existing techniques, the two UEs are each allocated orthogonal (e.g., TDM, FDM, or CDM) resources for four bits of HARQ-ACK feedback. For example, each resource may be one resource block (RB), with a total of eight orthogonal frequency division multiplexed (OFDM) symbols being used for PUCCH format 3.

When operating according to the techniques of the present disclosure, the two UEs are each allocated orthogonal resources for the one bit first stage HARQ-ACK feedback. The UEs are allocated the same resource for the second stage four bit HARQ-ACK feedback. For example, two resources of one RB may be one symbol sequence for the first stage using PUCCH format 0. For the second stage, eight OFDM symbols may be allocated from one RB in PUCCH format 3. Thus, it can be seen that the proposed techniques use less resources than the conventional techniques, saving seven OFDM symbols in this example.

Assuming a ten percent BLER for each bit, then for each UE, there is an approximately sixty-six percent chance that the four bits are all ACK. Thus, no second stage codebook is needed approximately sixty-six percent of the time. The sixty-six percent chance assumes the four code blocks have independent BLERs. Because the BLERs are likely correlated, however, the chance of generating all positive ACKs should be higher. Hence, there is approximately a ten percent chance that both UEs send the second stage codebook, and the codebooks will collide with each other. That is, each UE has a 34% (1-66%) chance of needing to send a second stage codebook. Thus, the chance of both UEs sending a second stage codebook is 0.33*0.33, which is approximately 10%. In addition to the low probability of both UEs using a second stage NOMA resource, the NOMA resource can help the network decode both UEs' second stage codebook in the case of collision, for example, with appropriate power control and a successive decoding scheme.

Aspects of the present disclosure relate to network configuration of PUCCH resources for two stage HARQ-ACK codebooks. In a first option, a resource for a two stage HARQ-ACK codebook is configured as one PUCCH resource. For example, radio resource control (RRC) signaling configures a PUCCH resource specifying which part is for the first stage HARQ-ACK codebook and which part is used for the second stage HARQ-ACK codebook. A single PUCCH resource ID is associated with the PUCCH resource in this option.

In a second option, the resources for the two stage HARQ-ACK codebook are configured separately. For example, RRC signaling may configure a resource for PUCCH format 0 for a first stage HARQ-ACK codebook and may separately configure a resource for PUCCH format 3 for a second HARQ-ACK codebook. In this second option, two PUCCH resource identifiers (IDs) are present. Additional RRC signaling may link the first stage resource and the second stage resource. In other implementations, downlink control information (DCI) may link the resources. For example, the PUCCH resource indicator in the DCI may include both the first stage resource ID and the second stage resource ID.

In both options, the RRC configuration includes standard PUCCH resource parameters. The parameters may include, for example, the startingPRB/PRB offset, first symbol (starting symbol)/startingSymbolIndex, number of symbols (nrofSymbols), initialCyclicShift, etc. In addition, the RRC configuration may also include parameters for NOMA. For example, the parameters may indicate a power coefficient allocated for the UE.

In some aspects of the present disclosure, if delay associated with transmitting and receiving HARQ-ACK feedback is not an issue, an on-demand second stage HARQ-ACK codebook may be used. In these aspects, the network may only allocate a first stage resource for one bit HARQ-ACK feedback for the UE. If the HARQ-ACK includes all ACKs, then there is no need for allocating resources for the second stage HARQ-ACK. If the network receives a 0 for the first stage HARQ-ACK bit (e.g., a NACK is present), the network transmits DCI to the UE to request the second stage HARQ-ACK feedback. The DCI may include an indication of the resources for the second stage HARQ-ACK codebook. In this case, different UEs may receive both OMA and NOMA resource allocations for the second stage HARQ-ACK codebook.

Figure 5:
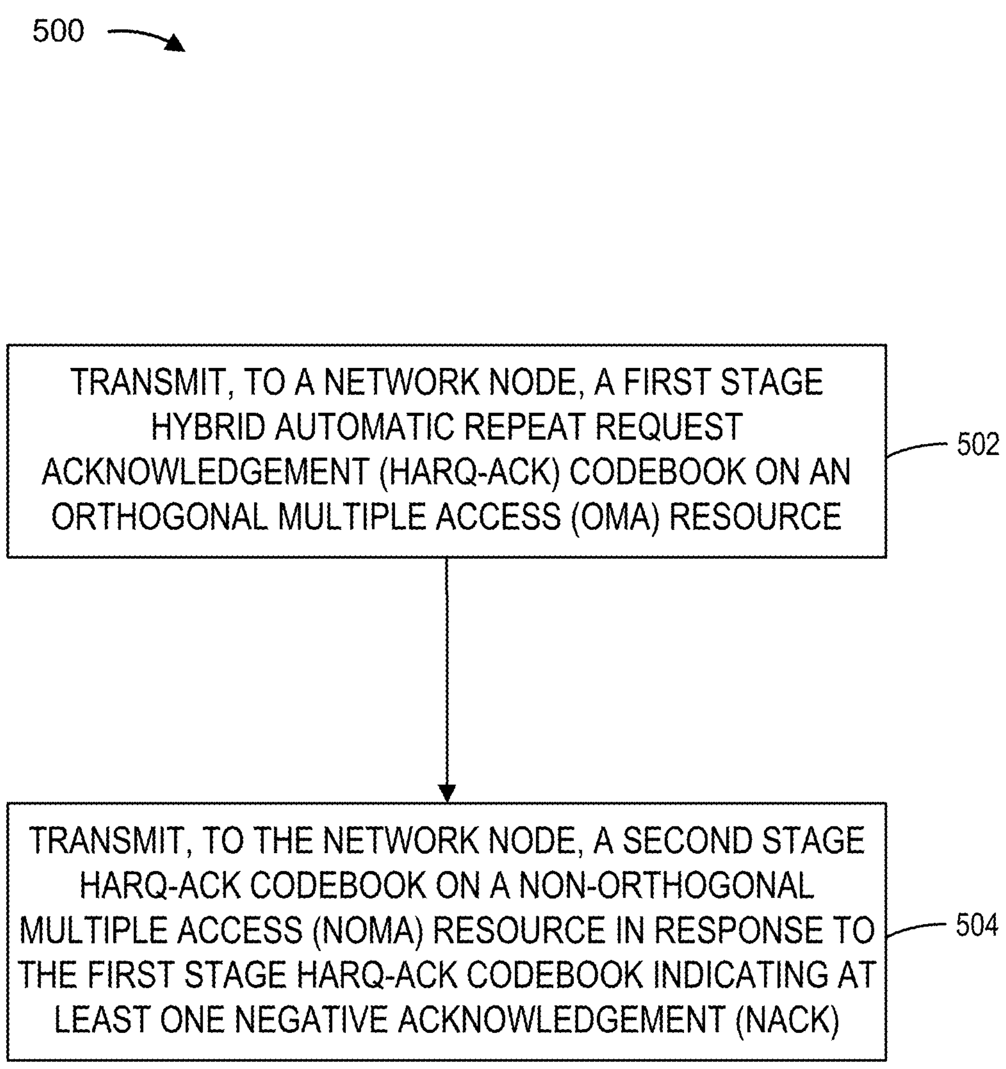
FIG. 5 is a flow diagram illustrating an example two stage HARQ-ACK process performed, for example, by a user equipment (UE), in accordance with various aspects of the present disclosure.

FIG. 5 is a flow diagram illustrating an example process 500 performed, for example, by a user equipment (UE), in accordance with various aspects of the present disclosure. The example process 500 is an example of two stage hybrid automatic repeat request acknowledgement (HARQ-ACK) using mixed orthogonal multiple access (OMA) and non-orthogonal multiple access (NOMA). The operations of the process 500 may be implemented by a UE 120.

At block 502, the user equipment (UE) transmits, to a network node, a first stage hybrid automatic repeat request acknowledgement (HARQ-ACK) codebook on an orthogonal multiple access (OMA) resource. For example, the UE (e.g., using the antenna 252, DEMOD/MOD 254, TX MIMO processor 266, transmit processor 264, controller/processor 280, memory 282, and/or the like) may transmit the first stage HARQ-ACK codebook. In some aspects, the first stage HARQ-ACK codebook comprises a single physical uplink control channel (PUCCH) bit.

At block 504, the user equipment (UE) transmits, to the network node, a second stage HARQ-ACK codebook on a non-orthogonal multiple access (NOMA) resource in response to the first stage HARQ-ACK codebook indicating at least one negative acknowledgement (NACK). For example, the UE (e.g., using the antenna 252, DEMOD/MOD 254, TX MIMO processor 266, transmit processor 264, controller/processor 280, memory 282, and/or the like) may transmit the second stage HARQ-ACK codebook. In some aspects, the UE receives a configuration for a single resource for both the first stage HARQ-ACK codebook and the second stage HARQ-ACK codebook, the configuration indicating an OMA portion of the single resource allocated to the first stage HARQ-ACK codebook and a NOMA portion of the single resource allocated to the second stage HARQ-ACK codebook. In other aspects, the UE receives a first configuration for the OMA resource for the first stage HARQ-ACK codebook and a second configuration for the NOMA resource for the second stage HARQ-ACK codebook. The UE may also receive a link between the OMA resource and the NOMA resource via radio resource control (RRC) signaling. In still further aspects, the UE receives a radio resource control (RRC) configuration for the NOMA resource. In yet other aspects, the UE receives a first configuration for the OMA resource for the first stage HARQ-ACK codebook and downlink control information (DCI) requesting the second stage HARQ-ACK codebook, the DCI indicating the NOMA resource for the second stage HARQ-ACK codebook.

Figure 6:
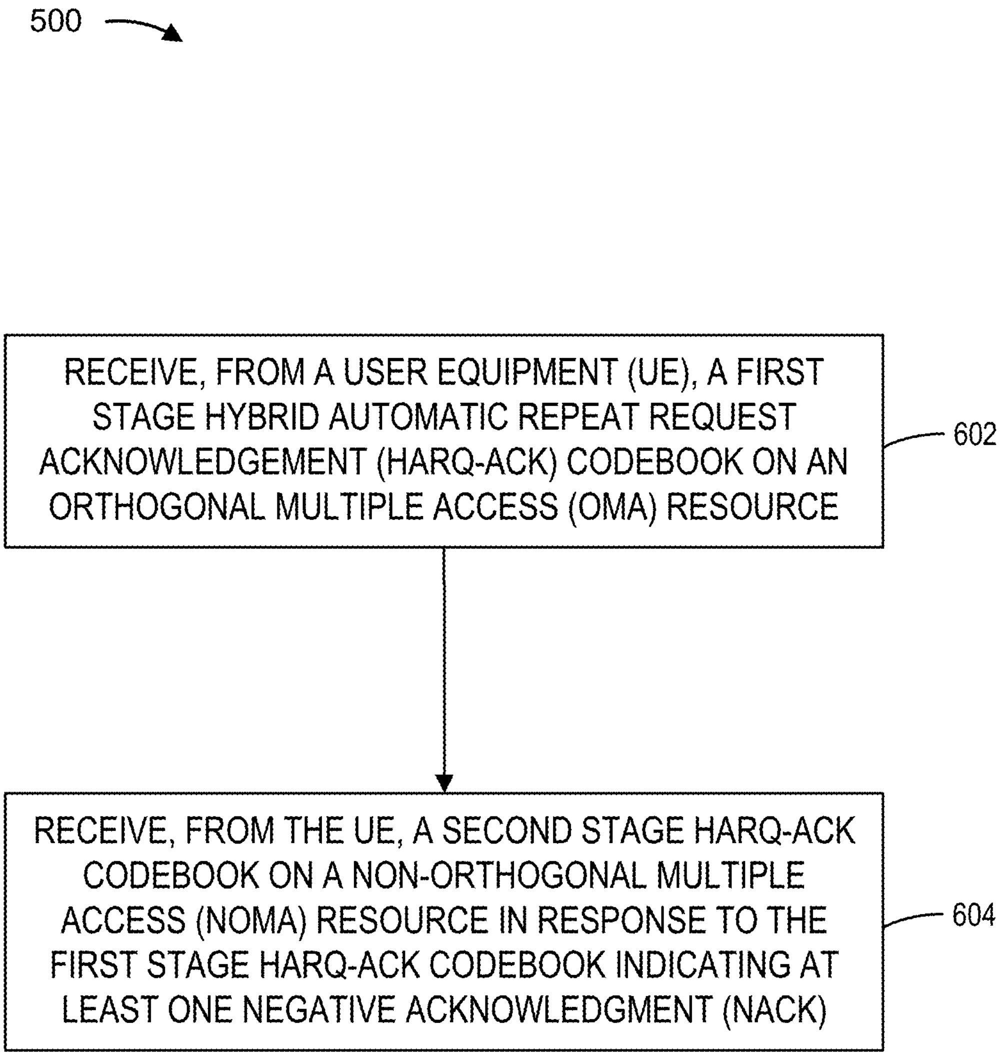
FIG. 6 is a flow diagram illustrating an example two stage HARQ-ACK process performed, for example, by a network device, in accordance with various aspects of the present disclosure.

FIG. 6 is a flow diagram illustrating an example process 600 performed, for example, by a network device, in accordance with various aspects of the present disclosure. The example process 600 is an example of two stage hybrid automatic repeat request acknowledgement (HARQ-ACK) using mixed orthogonal multiple access (OMA) and non-orthogonal multiple access (NOMA). The operations of the process 600 may be implemented by a base station 110.

At block 602, the base station receives, from a user equipment (UE), a first stage hybrid automatic repeat request acknowledgement (HARQ-ACK) codebook on an orthogonal multiple access (OMA) resource. For example, the base station (e.g., using the antenna 234, MOD/DEMOD 232, MIMO detector 238, receive processor 238, controller/processor 240, memory 242, and/or the like) may receive the first stage HARQ-ACK codebook. In some aspects, the first stage HARQ-ACK codebook comprises a single physical uplink control channel (PUCCH) bit.

At block 604, the base station receives, from the UE, a second stage HARQ-ACK codebook on a non-orthogonal multiple access (NOMA) resource in response to the first stage HARQ-ACK codebook indicating at least one negative acknowledgment (NACK). For example, the base station (e.g., using the antenna 234, MOD/DEMOD 232, MIMO detector 238, receive processor 238, controller/processor 240, memory 242, and/or the like) may receive the second stage HARQ-ACK codebook. In some aspects, the network device transmits a configuration for a single resource for both the first stage HARQ-ACK codebook and the second stage HARQ-ACK codebook, the configuration indicating an OMA portion of the single resource allocated to the first stage HARQ-ACK codebook and a NOMA portion of the single resource allocated to the second stage HARQ-ACK codebook. In other aspects, the network device transmits a first configuration for the OMA resource for the first stage HARQ-ACK codebook and a second configuration for the NOMA resource for the second stage HARQ-ACK codebook. The network device may also configure a link between the OMA resource and the NOMA resource via radio resource control (RRC) signaling. In still other aspects, the network device transmits a radio resource control (RRC) configuration for the NOMA resource. In other aspects, the network device transmits a first configuration for the OMA resource for the first stage HARQ-ACK codebook and transmitting downlink control information (DCI) requesting the second stage HARQ-ACK codebook, the DCI indicating the NOMA resource for the second stage HARQ-ACK codebook.

EXAMPLE ASPECTS

Aspect 1: A method of wireless communication by a user equipment (UE), comprising: transmitting, to a network node, a first stage hybrid automatic repeat request acknowledgement (HARQ-ACK) codebook on an orthogonal multiple access (OMA) resource; and transmitting, to the network node, a second stage HARQ-ACK codebook on a non-orthogonal multiple access (NOMA) resource in response to the first stage HARQ-ACK codebook indicating at least one negative acknowledgement (NACK).

Aspect 2: The method of Aspect 1, in which the first stage HARQ-ACK codebook comprises a single physical uplink control channel (PUCCH) bit.

Aspect 3: The method of Aspect 1 or 2, further comprising receiving a configuration for a single resource for both the first stage HARQ-ACK codebook and the second stage HARQ-ACK codebook, the configuration indicating an OMA portion of the single resource allocated to the first stage HARQ-ACK codebook and a NOMA portion of the single resource allocated to the second stage HARQ-ACK codebook.

Aspect 4: The method of Aspects 1 or 2, further comprising receiving a first configuration for the OMA resource for the first stage HARQ-ACK codebook and receiving a second configuration for the NOMA resource for the second stage HARQ-ACK codebook.

Aspect 5: The method of Aspects 1, 2 or 4, further comprising receiving a link between the OMA resource and the NOMA resource via radio resource control (RRC) signaling.

Aspect 6: The method of any of the preceding Aspects, further comprising receiving a radio resource control (RRC) configuration for the NOMA resource.

Aspect 7: The method of Aspects 1, 2, or 4-6, further comprising receiving a first configuration for the OMA resource for the first stage HARQ-ACK codebook and receiving downlink control information (DCI) requesting the second stage HARQ-ACK codebook, the DCI indicating the NOMA resource for the second stage HARQ-ACK codebook.

Aspect 8: A method of wireless communication by a network device, comprising: receiving, from a user equipment (UE), a first stage hybrid automatic repeat request acknowledgement (HARQ-ACK) codebook on an orthogonal multiple access (OMA) resource; and receiving, from the UE, a second stage HARQ-ACK codebook on a non-orthogonal multiple access (NOMA) resource in response to the first stage HARQ-ACK codebook indicating at least one negative acknowledgment (NACK).

Aspect 9: The method of Aspect 8, in which the first stage HARQ-ACK codebook comprises a single physical uplink control channel (PUCCH) bit.

Aspect 10: The method of Aspect 8 or 9, further comprising transmitting a configuration for a single resource for both the first stage HARQ-ACK codebook and the second stage HARQ-ACK codebook, the configuration indicating an OMA portion of the single resource allocated to the first stage HARQ-ACK codebook and a NOMA portion of the single resource allocated to the second stage HARQ-ACK codebook.

Aspect 11: The method of any of the Aspects 8-9, further comprising transmitting a first configuration for the OMA resource for the first stage HARQ-ACK codebook and transmitting a second configuration for the NOMA resource for the second stage HARQ-ACK codebook.

Aspect 12: The method of any of the Aspects 8-9 or 11, further comprising configuring a link between the OMA resource and the NOMA resource via radio resource control (RRC) signaling.

Aspect 13: The method of any of the Aspects 8-12, further comprising transmitting a radio resource control (RRC) configuration for the NOMA resource.

Aspect 14: The method of any of the Aspects 8-9 or 11-13, further comprising transmitting a first configuration for the OMA resource for the first stage HARQ-ACK codebook and transmitting downlink control information (DCI) requesting the second stage HARQ-ACK codebook, the DCI indicating the NOMA resource for the second stage HARQ-ACK codebook.

Aspect 15: An apparatus for wireless communication, comprising: at least one memory; and at least one processor coupled to the at least one memory, the at least one processor configured: to transmit, to a network node, a first stage hybrid automatic repeat request acknowledgement (HARQ-ACK) codebook on an orthogonal multiple access (OMA) resource; and to transmit, to the network node, a second stage HARQ-ACK codebook on a non-orthogonal multiple access (NOMA) resource in response to the first stage HARQ-ACK codebook indicating at least one negative acknowledgement (NACK).

Aspect 16: The apparatus of Aspect 15, in which the first stage HARQ-ACK codebook comprises a single physical uplink control channel (PUCCH) bit.

Aspect 17: The apparatus of Aspect 15 or 16, in which the at least one processor is further configured to receive a configuration for a single resource for both the first stage HARQ-ACK codebook and the second stage HARQ-ACK codebook, the configuration indicating an OMA portion of the single resource allocated to the first stage HARQ-ACK codebook and a NOMA portion of the single resource allocated to the second stage HARQ-ACK codebook.

Aspect 18: The apparatus of any of the Aspects 15-16, in which the at least one processor is further configured to receive a first configuration for the OMA resource for the first stage HARQ-ACK codebook and receive a second configuration for the NOMA resource for the second stage HARQ-ACK codebook.

Aspect 19: The apparatus of any of the Aspects 15-16 or 18, in which the at least one processor is further configured to receive a link between the OMA resource and the NOMA resource via radio resource control (RRC) signaling.

Aspect 20: The apparatus of any of the Aspects 15-19, in which the at least one processor is further configured to receive a radio resource control (RRC) configuration for the NOMA resource.

Aspect 21: The apparatus of any of the Aspects 15-16 or 18-20, in which the at least one processor is further configured to receive a first configuration for the OMA resource for the first stage HARQ-ACK codebook and receive downlink control information (DCI) requesting the second stage HARQ-ACK codebook, the DCI indicating the NOMA resource for the second stage HARQ-ACK codebook.

Aspect 22: An apparatus for wireless communication, comprising: at least one memory; and at least one processor coupled to the at least one memory, the at least one processor configured: to receive, from a user equipment (UE), a first stage hybrid automatic repeat request acknowledgement (HARQ-ACK) codebook on an orthogonal multiple access (OMA) resource; and to receive, from the UE, a second stage HARQ-ACK codebook on a non-orthogonal multiple access (NOMA) resource in response to the first stage HARQ-ACK codebook indicating at least one negative acknowledgment (NACK).

Aspect 23: The apparatus of Aspect 22, in which the first stage HARQ-ACK codebook comprises a single physical uplink control channel (PUCCH) bit.

Aspect 24: The apparatus of Aspect 22-23, in which the at least one processor is further configured to transmit a configuration for a single resource for both the first stage HARQ-ACK codebook and the second stage HARQ-ACK codebook, the configuration indicating an OMA portion of the single resource allocated to the first stage HARQ-ACK codebook and a NOMA portion of the single resource allocated to the second stage HARQ-ACK codebook.

Aspect 25: The apparatus of any of the Aspects 22-23, in which the at least one processor is further configured to transmit a first configuration for the OMA resource for the first stage HARQ-ACK codebook and transmit a second configuration for the NOMA resource for the second stage HARQ-ACK codebook.

Aspect 26: The apparatus of any of the Aspects 22-23 or 25, in which the at least one processor is further configured to configure a link between the OMA resource and the NOMA resource via radio resource control (RRC) signaling.

Aspect 27: The apparatus of any of the Aspects 22-26, in which the at least one processor is further configured to transmit a radio resource control (RRC) configuration for the NOMA resource.

Aspect 28: The apparatus of any of the Aspects 22-23 or 25-27, in which the at least one processor is further configured to transmit a first configuration for the OMA resource for the first stage HARQ-ACK codebook and transmit downlink control information (DCI) requesting the second stage HARQ-ACK codebook, the DCI indicating the NOMA resource for the second stage HARQ-ACK codebook.

The foregoing disclosure provides illustration and description, but is not intended to be exhaustive or to limit the aspects to the precise form disclosed. Modifications and variations may be made in light of the above disclosure or may be acquired from practice of the aspects.

As used, the term "component" is intended to be broadly construed as hardware, firmware, and/or a combination of hardware and software. As used, a processor is implemented in hardware, firmware, and/or a combination of hardware and software.

Some aspects are described in connection with thresholds. As used, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described may be implemented in different forms of hardware, firmware, and/or a combination of hardware and software. The actual specialized control hardware or software code used to implement these systems and/or methods is not limiting of the aspects. Thus, the operation and behavior of the systems and/or methods were described without reference to specific software code—it being understood that software and hardware can be designed to implement the systems and/or methods based, at least in part, on the description.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used should be construed as critical or essential unless explicitly described as such. Also, as used, the articles "a" and "an" are intended to include one or more items, and may be used interchangeably with "one or more." Furthermore, as used, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used, the terms "has," "have," "having," and/or the like are intended to be open-ended terms. Further, the phrase "based on" is intended to mean "based, at least in part, on" unless explicitly stated otherwise.

What is claimed is:

1. A method of wireless communication by a user equipment (UE), comprising:

transmitting, to a network node, a first stage hybrid automatic repeat request acknowledgement (HARQ-ACK) codebook on an orthogonal multiple access (OMA) resource, the first stage HARQ-ACK codebook indicating whether a second stage HARQ-ACK is to be sent depending on whether any of a multi-bit HARQ-ACK is a negative acknowledgement (NACK);

transmitting, to the network node, the second stage HARQ-ACK codebook on a non-orthogonal multiple access (NOMA) resource in response to the first stage HARQ-ACK codebook indicating at least one negative acknowledgement (NACK), the first stage HARQ-ACK codebook having a different bit length than the second stage HARQ-ACK codebook; and receiving a configuration for a single resource having a single resource identifier (ID) for both the first stage HARQ-ACK codebook and the second stage HARQ-ACK codebook, the configuration indicating an OMA portion of the single resource allocated to the first stage HARQ-ACK codebook and a NOMA portion of the single resource allocated to the second stage HARQ-ACK codebook.

2. The method of claim 1, in which the first stage HARQ-ACK codebook comprises a single physical uplink control channel (PUCCH) bit.

3. The method of claim 1, further comprising receiving a radio resource control (RRC) configuration for the NOMA resource.

4. A method of wireless communication by a network device, comprising:

receiving, from a user equipment (UE), a first stage hybrid automatic repeat request acknowledgement (HARQ-ACK) codebook on an orthogonal multiple access (OMA) resource, the first stage HARQ-ACK codebook indicating whether a second stage HARQ-ACK is to be sent depending on whether any of a multi-bit HARQ-ACK is a negative acknowledgement (NACK);

receiving, from the UE, the second stage HARQ-ACK codebook on a non-orthogonal multiple access (NOMA) resource in response to the first stage HARQ-ACK codebook indicating at least one negative acknowledgment (NACK), the first stage HARQ-ACK codebook having a different bit length than the second stage HARQ-ACK codebook; and transmitting a configuration for a single resource having a single resource identifier (ID) for both the first stage HARQ-ACK codebook and the second stage HARQ-ACK codebook, the configuration indicating an OMA portion of the single resource allocated to the first stage HARQ-ACK codebook and a NOMA portion of the single resource allocated to the second stage HARQ-ACK codebook.

5. The method of claim 4, in which the first stage HARQ-ACK codebook comprises a single physical uplink control channel (PUCCH) bit.

6. The method of claim 4, further comprising transmitting a radio resource control (RRC) configuration for the NOMA resource.

7. An apparatus for wireless communication, comprising:

at least one memory; and at least one processor coupled to the at least one memory, the at least one processor configured:

to transmit, to a network node, a first stage hybrid automatic repeat request acknowledgement (HARQ-ACK) codebook on an orthogonal multiple access (OMA) resource, the first stage HARQ-ACK codebook indicating whether a second stage HARQ-ACK is to be sent depending on whether any of a multi-bit HARQ-ACK is a negative acknowledgement (NACK);

to transmit, to the network node, the second stage HARQ-ACK codebook on a non-orthogonal multiple access (NOMA) resource in response to the first stage HARQ-ACK codebook indicating at least one negative acknowledgement (NACK), the first stage HARQ-ACK codebook having a different bit length than the second stage HARQ-ACK codebook; and to receive a configuration for a single resource having a single resource identifier ID) for both the first stage HARQ-ACK codebook and the second stage HARQ-ACK codebook, the configuration indicating an OMA portion of the single resource allocated to the first stage HARQ-ACK codebook and a NOMA portion of the single resource allocated to the second stage HARQ-ACK codebook.

8. The apparatus of claim 7, in which the first stage HARQ-ACK codebook comprises a single physical uplink control channel (PUCCH) bit.

9. The apparatus of claim 7, in which the at least one processor is further configured to receive a radio resource control (RRC) configuration for the NOMA resource.

10. An apparatus for wireless communication, comprising:

at least one memory; and at least one processor coupled to the at least one memory, the at least one processor configured:

to receive, from a user equipment (UE), a first stage hybrid automatic repeat request acknowledgement (HARQ-ACK) codebook on an orthogonal multiple access (OMA) resource, the first stage HARQ-ACK codebook indicating whether a second stage HARQ-ACK is to be sent depending on whether any of a multi-bit HARQ-ACK is a negative acknowledgement (NACK);

to receive, from the UE, the second stage HARQ-ACK codebook on a non-orthogonal multiple access (NOMA) resource in response to the first stage HARQ-ACK codebook indicating at least one negative acknowledgment (NACK), the first stage HARQ-ACK codebook having a different bit length than the second stage HARQ-ACK codebook; and to transmit a configuration for a single resource having a single resource identifier (ID) for both the first stage HARQ-ACK codebook and the second stage HARQ-ACK codebook, the configuration indicating an OMA portion of the single resource allocated to the first stage HARQ-ACK codebook and a NOMA portion of the single resource allocated to the second stage HARQ-ACK codebook.

11. The apparatus of claim 10, in which the first stage HARQ-ACK codebook comprises a single physical uplink control channel (PUCCH) bit.

12. The apparatus of claim 10, in which the at least one processor is further configured to transmit a radio resource control (RRC) configuration for the NOMA resource.

* * * * *